United States Patent [19]

Mori

[11] 4,444,468
[45] Apr. 24, 1984

[54] APPARATUS FOR COLLECTING SOLAR BEAMS

[76] Inventor: Kei Mori, 3-16-3-501, Kaminoge, Setagaya-ku, Tokyo, Japan

[21] Appl. No.: 292,123

[22] Filed: Aug. 12, 1981

[30] Foreign Application Priority Data

Aug. 18, 1980 [JP] Japan .................................. 55-113289

[51] Int. Cl.³ ............................. G02B 5/10; G02B 5/14
[52] U.S. Cl. .................................... 350/294; 350/96.1; 126/439
[58] Field of Search ....................... 350/294, 96.1, 503, 350/504; 126/439; 60/641.15; 136/214

[56] References Cited

U.S. PATENT DOCUMENTS 3,625,588 12/1971 Malifaud ........................... 350/96.24
3,811,749 5/1974 Abel ..................................... 350/504

FOREIGN PATENT DOCUMENTS 343380 5/1978 Austria .
2749286 5/1979 Fed. Rep. of Germany .
2346734 12/1977 France ................................ 350/504
1501297 2/1978 United Kingdom .

648931 2/1979 U.S.S.R. ............................... 350/294

Primary Examiner—John K. Corbin
Assistant Examiner—David Lewis
Attorney, Agent, or Firm—Merchant, Gould, Smith, Edell, Welter & Schmidt

[57] ABSTRACT

There is disclosed a solar beam collector for use in collecting and condensing solar beams to introduce them into light guides or conductors. To ensure that almost all components of the white light and other radiations including ultra-violet and infra-red rays are introduced into the light guides, parabolic mirrors are employed in order to converge all of the solar beams having various wave lengths at the inlet of the light guides, thereby avoiding the problem of chromatic aberration. The solar beam collector is compact in size and comprises a first parabolic mirror for converging the arriving solar beams, a second parabolic mirror for condensing the beams from the first mirror into parallel beams, a third parabolic mirror for converging the parallel beams from the second mirror at a fixed focus, and a light guide having an inlet end placed at the focus of the third mirror.

6 Claims, 5 Drawing Figures

APPARATUS FOR COLLECTING SOLAR BEAMS

FIELD OF THE INVENTION

This invention relates to improvements in and relating to an apparatus for collecting solar beams to enable them to be condensed and introduced into light conductors or guides for transmission therealong.

BACKGROUND OF THE INVENTION

Hitherto, various attempts have been made for utilization of the solar energy reaching the earth's surface. However, most of the prior art solar energy systems involve the transformation of the captured solar energy into electric or thermal energy and, as far as the inventor is aware, there are very few that directly utilize the solar beams themselves as a source of optical energy. It is obvious that, in lighting applications, the use of solar energy in the form of optical energy is advantageous, since transformation loss is obviated. This is possible by collecting the solar beams on the earth's surface where the solar beams arrive, introducing them into an end of a bundle of light guides or conductors for transmission therealong and then allowing them to issue out of the other end of the light guides to illuminate the spaces where illumination is required. The solar beams as introduced into the light conductors propagate therealong by being totally reflected at the boundary surface thereof. The solar beams having an angle of incidence which is larger than the critical angle of incidence of the light guides are not reflected by the boundary surface and, thus, are able to transmit through the boundary surface to leak out of the light guides. The critical angle of incidence is normally not greater than about 24° for a light conductor made from pure silicate. Accordingly, the essential requirement for a solar beam collecting apparatus intended for the above mentioned purposes is that the solar beams must have an angle of incidence as small as possible and not larger than about 24° and they must be converged sufficiently for their introduction into the light guides which often have a small diameter.

The inventor has previously proposed a solar beam collecting and converging apparatus comprising a plurality of lens systems, (Japanese Patent Application Laid-Open Publication No. 55-28055(1980)). However, this apparatus suffers from the disadvantage that due to chromatic aberration the focus of a lens system varies considerably depending on the wave length of incident light rays. This fluctuation of the focal length leads to the facts that those light rays which have a large wave length are not adequately converged towards the inlet of the light conductors while the angle of incidence of those light rays having a small wave length become larger than the critical angle of incidence of the material forming the light guides, whereby the problem of the light leakage arises. As a result, it was not possible to introduce the whole components of a white light, that is, the sun light, which have passed through the marginal area of a converging lens, effectively into the light conductors. If a single lens system having a relatively long focal distance to a lens diameter, that is, a small angle of incidence is to be used, then the overall dimension of the collecting apparatus which needs to have a large light receptive surface area becomes prohibitive.

SUMMARY OF THE INVENTION

An object of the invention is to provide a solar beam collecting apparatus which is free from the problem of chromatic aberration.

Another object of the invention is to provide a solar beam collecting apparatus which is compact in size.

Still another object of the invention is to provide a solar beam collecting apparatus capable of effectively introducing all of the collected, condensed solar beams into the light conductors in such a manner that they propagate therealong without leakage.

According to the invention, there is provided a solar beam collecting apparatus comprising: a first parabolic mirror for receiving and reflecting the solar beams arriving thereon; a second parabolic mirror having a focal point common to that of the first parabolic mirror for reflecting the solar beams from said first mirror to condense them into parallel beams with an enhanced light energy density; a third parabolic mirror for reflecting said parallel beams from said second mirror to converge them towards a focal point thereof; and at least one light conductor having an inlet positioned at the focal point of said third mirror, so that the solar beams from said third mirror are introduced into the light conductor. The problem of chromatic aberration is eliminated by the use of parabolic mirrors in place of lens systems. As the convergence of the solar beams takes place twice, that is, first at the first parabolic mirror and then at the third parabolic mirror, the overall size of the collecting apparatus can be made compact.

According to the invention in another aspect, there is provided an apparatus for collecting the solar beams which comprises: a first parabolic mirror for receiving and reflecting the solar beams arriving thereon; a second parabolic mirror having a focal point common to that of the first mirror and positioned opposite said first mirror with respect to said common focal point for reflecting the solar beams from the first mirror to condense them into parallel beams with an enhanced light energy density; a third parabolic mirror having a focal point positioned roughly at the center of the second mirror for reflecting the parallel beams from the second mirror to converge at the center of the second mirror, and; at least one light conductor having an inlet positioned at the center of the second mirror so that the beams from the third mirror are introduced into the light conductor.

Other features and advantages of the invention will become apparent from the following description.

DESCRIPTION OF THE PREFERRED EMBODIMENTS

Figure 1:
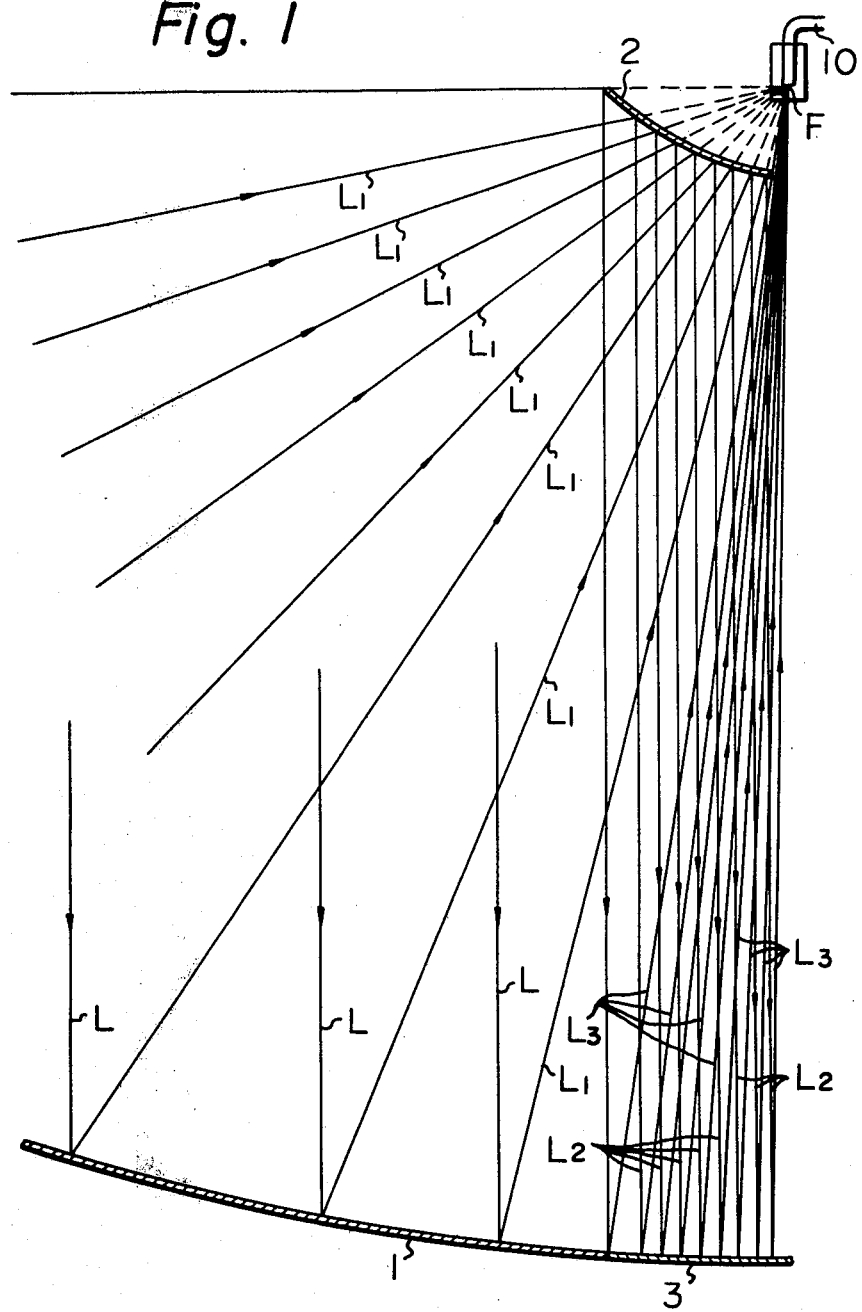
FIG. 1 is a partial view in cross-section of an embodiment of the invention.

Referring to the drawings, FIG. 1 illustrates a half of the cross-section of a solar beam collecting and converging apparatus according to the invention, the other half being ommited to simplify the drawing, as the apparatus has the form of a revolving body turning around an axis of symmetry. In FIG. 1, the reference numeral 1 denotes a first parabolic mirror to receive the solar beams L, 2 is a second parabolic mirror for reflecting the light rays $L_1$ reflected by the first parabolic mirror 1, and 3 is a third parabolic mirror for reflecting the light rays $L_2$ from the second parabolic mirror 2. These first and second parabolic mirrors 1 and 2 have a common focal point, as shown at F. The focus of the third parabolic mirror 3 may be positioned also at F, as shown, or any other suitable location. With this arrangement, the light rays $L_1$ reflected by the first mirror 1 are converged toward the focus F to arrive straight on at the second parabolic mirror 2 which, in turn, reflects the rays towards the thrid parabolic mirror 3 in the form of a bundle of parallel light rays $L_2$ with an enhanced light energy density. Then, the third mirror 3 reflects the rays $L_2$, as shown by arrows $L_3$, that converge towards the focus F. An inlet end of the light conductors or guides 10 is placed at the focus F to receive therein the thus condensed and converged solar beams to propagate therealong. Thus, according to this embodiment, it is possible to converge solar beams effectively and conduct them into the light conductors, without allowing chromatic aberration to occur because no refraction takes place in the optical path up to the light conductors. The position of the focal point are the same for all rays, even though the wave lengths vary, and solar beams or white light can be introduced effectively into the light conductors. It is also possible to obtain the solar beams with a small angle of incidence in spite of the fact that the distance between the first parabolic mirror and the light conductor is made considerably shorter than in the case wherein only a single parabolic mirror is employed. This enables the apparatus to be compact.

The second and third parabolic mirrors 2 and 3 receive a more dense light energy per unit surface area than the first parabolic mirror 1. Thus, the second and third mirrors 2 and 3 undergo more severe thermal distortion than the first. For this reason, it is preferable to use a highly heat resistive material for the second and third mirrors. The second and third parabolic mirrors may be made from a plate of ceramic glass coated with an aluminium layer and the first parabolic mirror may be made from a plate of acrylic resins coated with a layer of aluminium by a conventional evaporation coating technique. However, it will be understood that the first and third mirrors may be made integrally from a single material in the case where the workability of the material and the production costs are allowable. It is possible to enlarge the geometry of the second parabolic mirror 2 about its focal point F and correspondingly increase the size of the third mirror 3. In this case, the light rays reflected by the third mirror will again be reflected by the second mirror to become parallel light rays which will be reflected more than one time by the third mirror before they enter into the mouth of the light guide.

Figure 2:
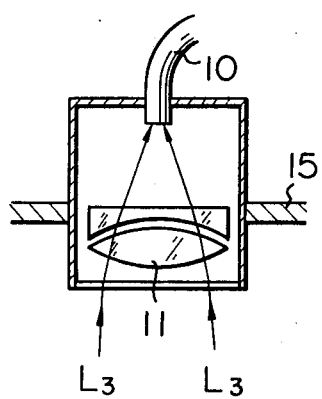
FIGS. 2 and 3 illustrate examples of optical systems which may be suitably used in combination with the apparatus of the invention.
Figure 3:
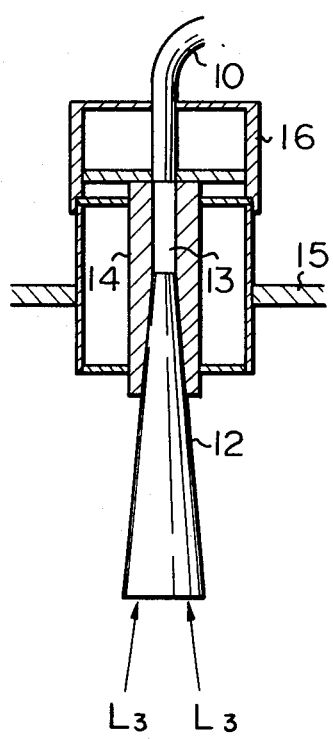

FIGS. 2 and 3 illustrate optical devices that may optionally be used in combination with the above described collecting apparatus for further converging the light rays $L_3$ from the third parabolic mirror 3. In the device of FIG. 2, an achromatic lens 11 having a short focal length is mounted on the framework 15 between the inlet end of the light guide 10 and the third parabolic mirror. The device of FIG. 3 includes a tapered light guide 12 inserted into a tubular holder 14 which is mounted to the framework 15. The light conductor 10 is held in place by means of a support 16. The tubular holder 14 receives a light focussing rod 13 aligned with the tapered light guide 12 and the inlet of the light conductor 10. This light focussing rod 13 is a gradient-index cylindrical medium with a parabolic refractive index distribution and serves as a converging lens.

Figure 4:
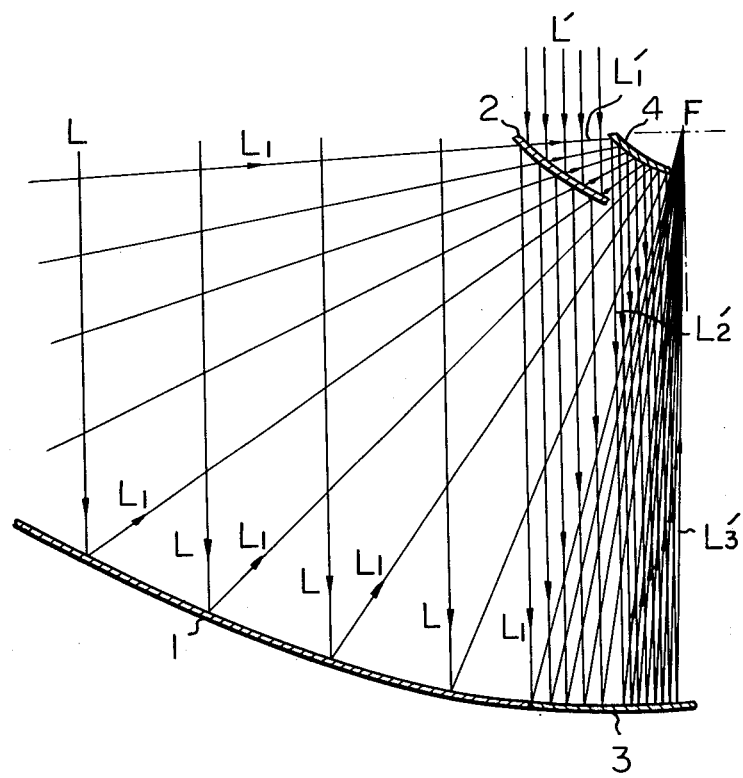
FIGS. 4 and 5 are cross-sectional views of a second and a third embodiment of the invention, respectively.

Referring to FIG. 4, there is shown another embodiment of the invention which comprises the first, second and third parabolic mirrors as in the first embodiment and wherein a fourth parabolic mirror is provided behind the second mirror. In this embodiment, the upper surface of the second parabolic mirror 2 is also provided with a parabolic mirror surface having a focal point common to the afore-mentioned common focus F so that the solar beams L' arriving at the back of the second mirror 2 are reflected towards the focus F. The fourth parabolic mirror 4 has an outer diameter roughly equal to the inner diameter of the second mirror 2 and has its focal point common to F. The solar beams L falling on the first mirror 1 are reflected by the lower surface of the second mirror 2 towards the third mirror 3, which in turn reflects them to converge at the focus F, as in the preceding embodiment. The solar beams L' falling on the upper back surface of the second mirror 2 are reflected by the latter towards F as shown by arrows $L_1'$ and reflected by the fourth mirror 4 to become parallel beams $L_3$, directed towards the third mirror 3, which in turn reflects them to converge at F. By providing the second mirror with a parabolic upper mirror surface and by installing a fourth parabolic mirror behind the second mirror, this embodiment enables collection of the solar beams arriving at the back area of the second mirror, thereby increasing the efficiency of the apparatus, which beams would not be collected and utilized in the first embodiment. It is also possible to arrange in a side-by-side relationship more than two second parabolic mirrors having a common focal point at F. This enables the light rays that would otherwise be directed solely to the third and fourth mirrors to be distributed over more than two second mirrors so that the light density per unit surface area of the third and fourth mirrors is further decreased whereby the flexibility for the material choice and the durability of the material are improved.

Figure 5:
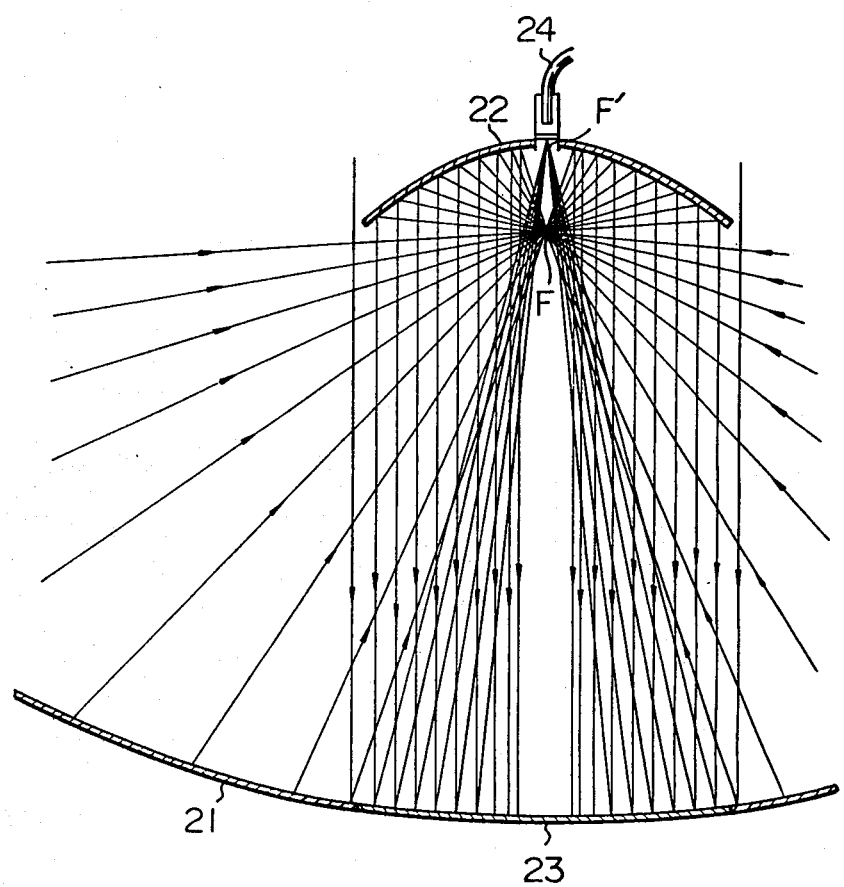

FIG. 5 illustrates a further embodiment of the invention. In this embodiment, the solar beam collector includes first and second parabolic mirrors 21 and 22 having a common focal point at F and positioned opposite to one another with respect to the focal point F. The collector also has a third parabolic mirror 23. The focal point F' of the third mirror 23 is so selected that it is situated at the center of the second parabolic mirror 22. The solar beams arriving at the first mirror 21 are reflected to pass through the focus F and reach the second mirror 22, which reflects them to become parallel beams with an enhanced light energy density and directs them to the third mirror 23. The parallel beams thus condensed are then reflected by the third mirror 23 to converge at the focus F', where the inlet opening of the light conductors 24 are placed. It is possible to provide at F' either of the optical devices as shown in FIGS. 2 and 3, so that the thus condensed and converged solar beams are more effectively introduced into the light guides. With this construction, it is possible to visually recognize the position of the focal point F, so that the relative positioning of the first and second mirrors is facilitated.

I claim:

1. Apparatus for collecting the solar beams comprising:
   a first parabolic mirror for receiving and reflecting the solar beams arriving thereon;
   a second parabolic mirror having a focal point common to that of said first parabolic mirror for reflecting the solar beams from said first mirror to condense them into parallel beams with an enhanced light energy density;
   a third parabolic mirror for reflecting said parallel beams from said second mirror to converge them towards a focal point thereof, and;
   at least one light conductor having an inlet positioned at the focal point of said third mirror, so that the solar beams from said third mirror are introduced into said light conductor.

2. Apparatus as claimed in claim 1, wherein said third parabolic mirror has its focal point common to that of the first and second parabolic mirrors.

3. Apparatus as claimed in claim 2, wherein said third parabolic mirror is made from a highly heat resistive material.

4. Apparatus as claimed in claim 1, wherein the upper surface of said second parabolic mirror is formed with a parabolic mirror surface for reflecting the solar beams arriving at the back of said second parabolic mirror and wherein there is provided a fourth parabolic mirror for reflecting the solar beams from said mirror surface towards said third parabolic mirror, said upper mirror surface and fourth parabolic mirror each having its focal point common to that of said first and second parabolic mirrors.

5. Apparatus as claimed in claim 4, wherein said second parabolic mirror comprises parabolic mirrors arranged in a side-by-side relationship.

6. Apparatus for collecting solar beams comprising:
   a first parabolic mirror for receiving and reflecting the solar beams arriving thereon;
   a second parabolic mirror having a focal point common to that of said first parabolic mirror and positioned opposite to said first mirror with respect to said common focal point for reflecting the solar beams from said first parabolic mirror to condense them into parallel beams with an enhanced light energy density;
   a third parabolic mirror having its focal point positioned roughly at the center of said second parabolic mirror for reflecting the parallel beams from said second mirror to converge at said center of said second mirror, and;
   at least one light conductor having an inlet positioned at the center of said second parabolic mirror so that the solar beams from said third mirror are introduced into the light conductor.

* * * * *